Nov. 8, 1932.   A. MEYER   1,886,966
ROLLER BEARING FOR HOT SHAFTS
Filed April 3, 1930

Inventor
Adolf Meyer
By
Attorney

Patented Nov. 8, 1932

1,886,966

UNITED STATES PATENT OFFICE

ADOLF MEYER, OF KUSNACHT NEAR ZURICH, SWITZERLAND, ASSIGNOR TO AKTIENGE-SELLSCHAFT BROWN BOVERI & CIE., OF BADEN, SWITZERLAND, A JOINT STOCK COMPANY OF SWITZERLAND

ROLLER BEARING FOR HOT SHAFTS

Application filed April 3, 1930, Serial No. 441,194, and in Germany August 31, 1929.

The use of roller bearings for hot shafts frequently presents difficulties, as the heat of the shaft is transmitted directly to the inner race of the bearing. This causes the latter to expand and to exert an outwardly directed force on the balls or rollers, whereby the bearing is as it were strained, as the outer race retains a low temperature and consequently does not take part in the increase in diameter. This results in the bearing jamming and in increased wear. This disadvantage may be partially overcome by the bearing being given a relatively large amount of clearance. This, however, entails the roller bearing being non-standard and the danger of the bearing not running quietly when the shaft is cold.

The present invention overcomes these difficulties by the roller bearing being connected to the shaft and at a certain distance laterally of the bearing by means of a thin sleeve acting as a support and having an internal diameter which is greater than the diameter of the shaft, special cooling means being provided so that the roller bearing and the shaft expand independently of one another and still remain accurately centered. A further advantage is that the inner race of the bearing is only loaded by the resilient action of the thin sleeve. If the sleeve be made very thin the internal pressure strain exerted on the bearing will only be very slight.

In the accompanying drawing several constructional examples of the invention are shown.

Figure 1:
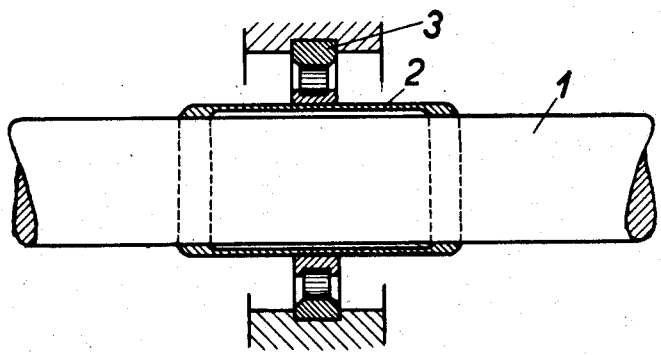
Figures 2, 3:
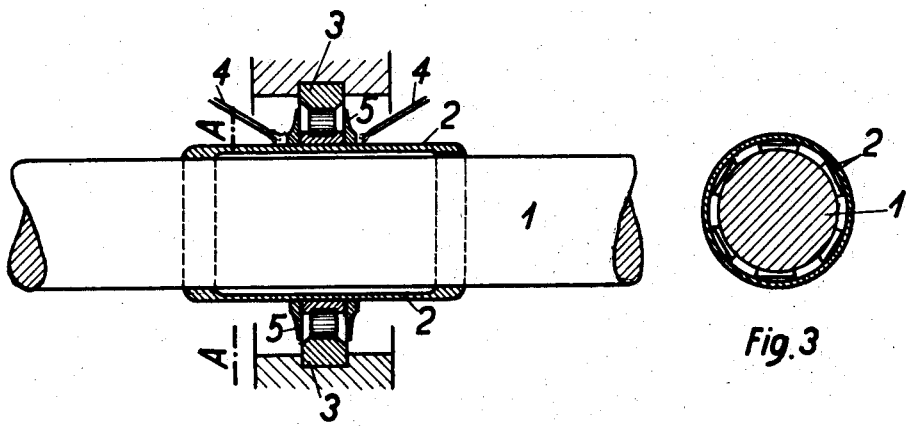
Figure 4:
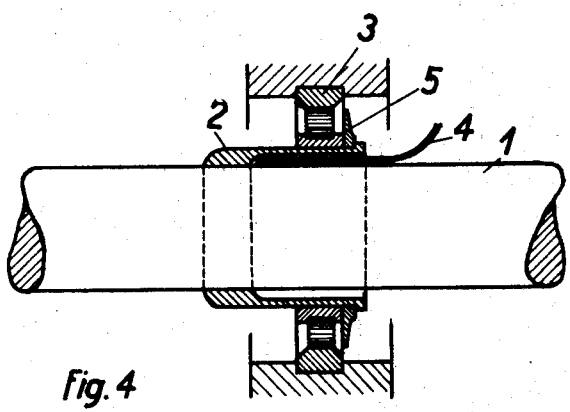

Fig. 1 illustrates a roller bearing with sleeve, Fig. 2 the roller bearing with lubricating means, Fig. 3 is a cross-section on line A—A of Fig. 2, and Fig. 4 a roller bearing with a bush supported on one side only.

1 is the shaft, 2 the thin sleeve, 3 the bearing, 4 tubes supplying the lubricant and 5 oil deflector discs.

The result of this arrangement is that the sleeve will be maintained at a relatively low temperature in the vicinity of the bearing, with resultant expansion of such slight extent as to obviate possibility of the exertion of harmful pressure against the bearing. It is obviously of advantage to keep the temperature of the sleeve as low as possible in the neighbourhood of the bearing. This can be assisted by the sleeve being made of a material which is a poor heat conductor. The contact surface between the sleeve and the shaft can also be reduced to a minimum. This latter arrangement is shown in Fig. 3 which is a section on line A—A of Fig. 2. As it is almost always necessary for reasons of strength for the sleeve to have a certain thickness, the favourable effect of the elastic sleeve must be increased and completely utilized by the sleeve 2 being cooled next to the bearing by means of bearing lubrication and by an additional supply of lubricant through tubes 4. In this case oil deflector discs 5 are provided, which prevent the lubricant entering the bearing 3 in an unsuitable manner and eventually damaging it.

In another constructional form of the invention the sleeve 2 makes contact only at one side of the bearing 3 with the shaft 1, this is shown in Fig. 4. In this case the lubricant is preferably introduced through the tubes 4 under the sleeve 2 and the oil deflector discs 5 can again be employed.

Having now particularly described and ascertained the nature of my said invention and in what manner the same is to be performed, I declare that what I claim is:

1. The combination with a rotatable shaft, of an anti-friction supporting bearing therefor, comprising a sleeve surrounding the said shaft and affixed thereto at the opposite ends of the sleeve, an internal bearing race affixed to the outer circumference of the sleeve intermediate the ends thereof, the internal diameter of the said sleeve between the ends thereof being greater than the diameter of the shaft to permit independent expansions and contractions of the said sleeve and shaft, and means disposed to permit the flow of cooling fluid into contact with the said sleeve at points adjacent the affixation of the said race thereto.

2. The combination with a rotatable shaft, of an anti-friction supporting bearing therefor, comprising a sleeve surrounding the said shaft and affixed thereto at points adjacent the ends of the said sleeve, the internal diameter of the said sleeve between the said points of affixation being greater than the diameter of the said shaft to compensate for differences in expansion of the said shaft and sleeve, an internal bearing race affixed to the said sleeve intermediate the said points of affixation and means for permitting flow of cooling fluid into contact with the said sleeve at points adjacent the said affixation of said race thereto.

3. The combination with a rotatable shaft, of an anti-friction supporting bearing therefor comprising a sleeve surrounding the said shaft and affixed thereto at points adjacent the ends of the said sleeve, the internal diameter of the said sleeve being greater than the diameter of the said shaft between the points of affixation thereof to the shaft to compensate for differences in expansion of the said shaft and sleeve, an internal bearing race affixed to the said sleeve, bearing rollers supported in said race, means for permitting flow of cooling fluid into contact with the said sleeve at points adjacent the said affixation of said race thereto, and disc affixed to the said sleeve disposed to deflect cooling fluid away from said race and said rollers.

4. In combination with a rotatable shaft subjected to abnormal temperatures, and an anti-friction supporting bearing therefor, of means for reducing heat conduction from the said shaft to the said bearing, the said means comprising a relatively thin-walled sleeve interposed between the said shaft and bearing, the said sleeve having an internal diameter greater than the diameter of the said shaft, the said sleeve being affixed to the said shaft at an end of the sleeve only, and means for permitting flow of cooling fluid into contact with the said sleeve and said shaft between the shaft and the internal surface of the sleeve to cool the latter.

In testimony whereof I have hereunto subscribed my name this 18th day of March, A. D. 1930.

ADOLF MEYER.